United States Patent [19]
Kimura et al.

[11] Patent Number: 5,768,657
[45] Date of Patent: Jun. 16, 1998

[54] METHOD AND APPARATUS FOR DISPLAYING MODE SETTING INFORMATION

[75] Inventors: Hiroyuki Kimura, Yokohama; Tadashi Suzuki, Tokyo, both of Japan

[73] Assignee: Canon Kabushiki Kaisha, Tokyo, Japan

[21] Appl. No.: 662,946

[22] Filed: Jun. 13, 1996

[30] Foreign Application Priority Data

Jun. 19, 1995 [JP] Japan ................... 7-151652

[51] Int. Cl.⁶ ........................................... G03G 15/00
[52] U.S. Cl. ............................................... 399/81
[58] Field of Search ........................... 399/1, 74, 81

[56] References Cited

U.S. PATENT DOCUMENTS

| | | | |
|---|---|---|---|
| 4,398,819 | 8/1983 | Schron | 399/81 |
| 4,792,827 | 12/1988 | Ogura | 399/81 |
| 4,862,219 | 8/1989 | Yoshida et al. | |
| 4,870,447 | 9/1989 | Yoshida et al. | |
| 5,113,222 | 5/1992 | Wilson et al. | 399/81 |
| 5,115,273 | 5/1992 | Ujiie et al. | |
| 5,251,023 | 10/1993 | Arimoto et al. | |
| 5,377,321 | 12/1994 | Kaneko et al. | 395/163 |
| 5,552,858 | 9/1996 | Ujiie et al. | |
| 5,583,617 | 12/1996 | Altrieth, III et al. | 399/81 |

*Primary Examiner*—Sandra L. Brase
*Attorney, Agent, or Firm*—Fitzpatrick, Cella, Harper & Scinto

[57] ABSTRACT

There is described a device and a method for setting the operation mode of an apparatus, such as a copy machine, wherein the pressing of a guide key causes guidance information, as well as operation mode setting keys to be displayed on a guidance screen; and wherein the pressing of a key on the guidance screen causes further guidance information as well as operation mode setting keys to be displayed.

10 Claims, 13 Drawing Sheets

| FIG. 4A | FIG. 4B |

| FIG. 6A | FIG. 6B |

METHOD AND APPARATUS FOR DISPLAYING MODE SETTING INFORMATION

BACKGROUND OF THE INVENTION

1. Field of the Invention

The present invention relates to novel methods and apparatus for displaying guidance information and selecting operation modes in a mode setting device.

2. Description of the Related Art

Many electronically controlled devices are capable of several different operations. For example, photocopying machines operate in different modes to provide one or two sided copying, multiple or single copies, etc. The procedures that must be followed for setting the operation mode of the machine to perform desired ones of these different operations have become very complicated.

One technique for handling this problem has been to provide a guidance key which, when pressed, results in the display of instructions or guidance information concerning which of several operation keys to press at an operation panel in order to cause the machine to perform the desired operation.

Conventionally, however, the pressing of a guidance key only results in the presentation of guidance information; and operation mode setting keys are separately displayed. As a result, an inexperienced operator may have difficulty in obtaining a desired mode setting display or in selecting another desired operation mode after having obtained a desired setting screen. As a result, the setting operations required to obtain a desired operation mode may become very confusing and time consuming.

SUMMARY OF THE INVENTION

It is an object of the present invention to provide an operation mode setting device and method which is free of the above-described problem.

It is another object of this invention to provide an operation mode setting device and method that allows even an inexperienced person to carry out the setting of a desired operation mode.

A further object of this invention is to provide an operation mode setting device and method that makes it possible to set a desired operation while guidance information relating to a mode setting key and the mode setting key itself are displayed on a screen.

According to one aspect of this invention, there is provided a novel operation mode setting device which comprises a touch panel display, a guidance key, a first control means and a second control means. The touch panel display is connected to cause guidance information regarding a settable operation mode to be displayed thereon. The first control means is connected to cause a group of operation mode setting keys to be displayed on the touch panel display prior to an input from said guidance key. The second control means is connected to respond to an input from the guidance key to cause the touch panel display to display guidance information along with a display of an operation mode setting key. The first control means is also connected to respond to the input from an operation mode setting key which is displayed together with the guidance information on the touch panel display in order to set the operation mode.

According to another aspect of the invention, there is provided a novel operation mode setting device which comprises a guidance key arranged to produce a display of guidance information regarding a desired mode setting; a first setting means for setting a desired operation mode without input from the guidance key; and a second setting means for setting a desired operation mode in response to the display of guidance information produced by operation of the guidance key.

According to a further aspect of the invention, there is provided a novel method of setting an operation mode in an apparatus which includes a touch panel display and a guidance key that causes display of guidance information regarding a settable operation mode. This method comprises the steps of displaying, on the touch panel display, both guidance information and an operation mode setting key, in response to an input from the guidance key; setting a operation mode in response to an input from the operation mode setting key displayed on the touch panel; and displaying a group of operation mode setting keys on the touch panel display prior to input from the guidance key.

DETAILED DESCRIPTION OF THE PREFERRED EMBODIMENT

Figure 1:
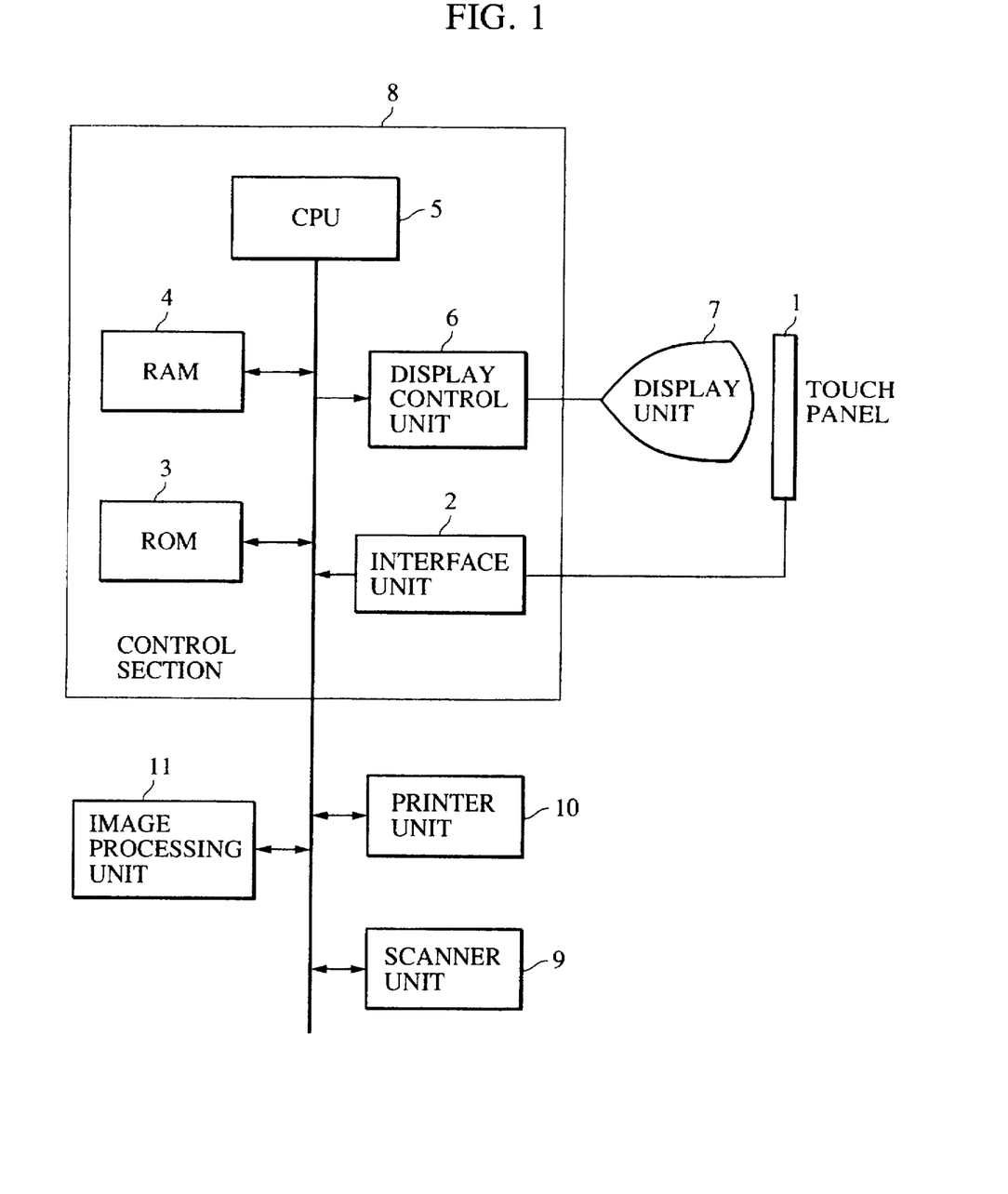
FIG. 1 is a block diagram showing the organization of a guidance display and mode setting apparatus, according to the present invention, as used with a copier.

In the block diagram of FIG. 1, which shows the organization of a guidance display and mode setting apparatus of the present invention as used with a copier, a touch panel 1 is positioned adjacent a display unit 7, which in turn is connected via an interface unit to a central processing unit (CPU) 5 in a control section 8. When a user touches the surface of the touch panel 1, a signal representing the coordinates of the location on the panel 1 that was touched is supplied via the interface unit 2 to the CPU 5. Since the touch panel 1 is adjacent the display unit 7 these coordinates correspond to the particular area on the display unit that was touched.

The control section 8 also contains a read only memory (ROM) 3 which stores operation mode display data, guidance display data, a control program and so forth. There is also provided in the control section 8, a random access memory (RAM) 4 which stores changeable data, for example, the current setting of the apparatus. Finally, there is provided in the control section 8, a display control unit 6 which supplies display signals to the display unit 7.

As shown, the interface unit 2, the ROM 3, the RAM 4, and the display control unit 6 are all connected to a central processing unit (CPU) 5 in the control section 8. The CPU 5 sends signals to the display control unit 6 to form a setting screen, which corresponds to a current operation mode setting, or a guidance screen, which provides guidance information to the operator according to the current operation state of the apparatus and the location on the touch panel that has been touched. The touch panel 1 enables an operator to initiate a desired operation mode setting by pressing the touch panel at a location thereon where the corresponding mode setting key appears.

The display unit 7 is a full-dot liquid crystal display (LCD) which displays data received from the display control unit 6. This display unit displays operation mode setting keys; and it also serves as a guidance display screen.

The control section 8 is also connected to a scanner unit 9 that reads an original document and converts an image on the document to image data. In addition, the control section 8 is connected to a printer unit 10 and an image processing unit 11. The printer unit converts the image data to visible images which it prints on recording sheets. The image processing unit 11 operates to process the image data in any desired manner.

Figure 2:
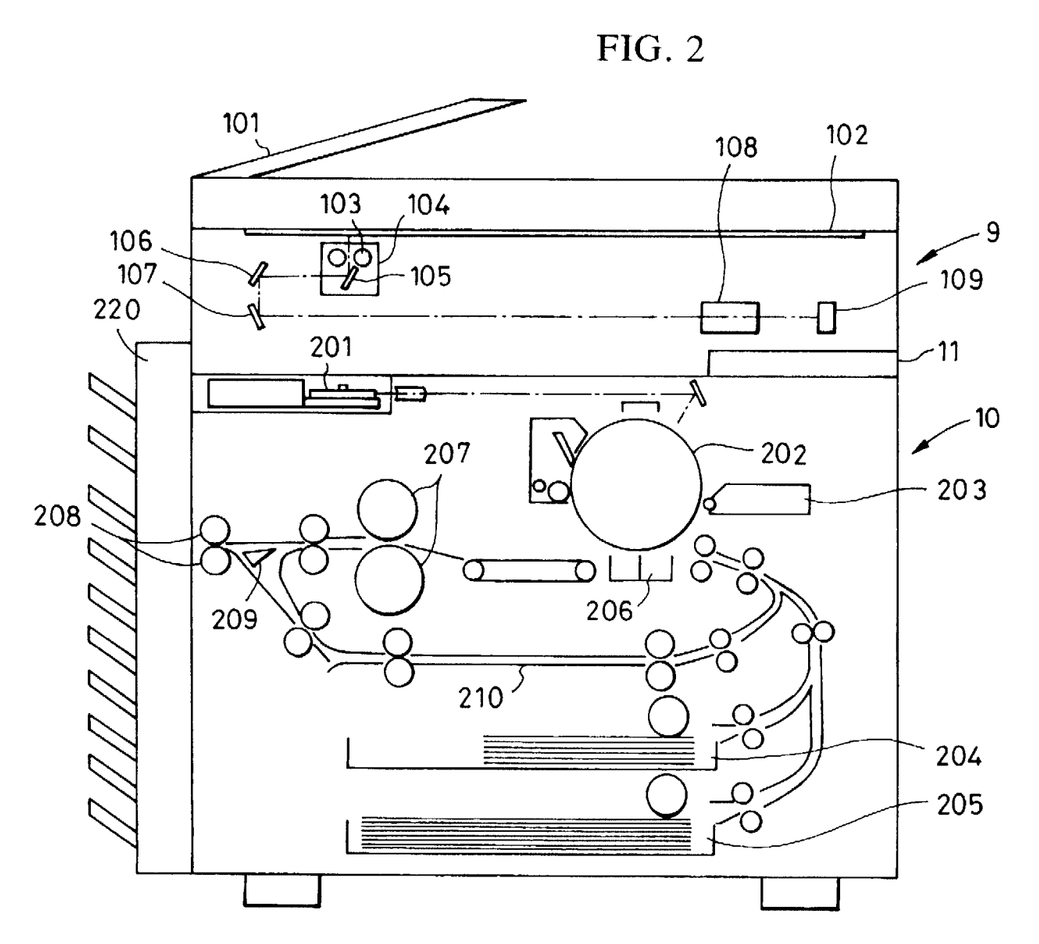
FIG. 2 is a diagrammatic section view, showing the reader and printer section of a copier, with which the present invention is used.

The arrangement of the scanner and printer units 9 and 10 in a copying machine is shown in FIG. 2.

Originals of documents to be copied are placed in an original document feeder 101 in the scanner unit 9; and they are successively positioned by the document feeder, one sheet at a time, onto a glass surface 102. A scanner 104, which contains lamps 103, moves along under the glass surface to scan the document. Light from the lamps 103 is reflected off the document; and then it is further reflected by mirrors 105, 106 and 107 toward a lens 108. The lens 108 directs the reflected light onto an image sensor 109. This may be a device which contains charge coupled diodes (CCD); and it is generally referred to as a "CCD sensor". The image sensor 109 converts the light image into electrical data signals and supplies these signals to the image processing unit 11 where they are variously processed.

Electrical signals from the image processing unit 11 are supplied to an exposure control unit 201 which reconverts them into light signals. These light signals are directed onto a photosensitive drum 202 where they form a latent electrostatic image. This image is developed by a developing device 203 which applies toner to the drum at locations thereon corresponding to the latent electrostatic image. As the drum 202 rotates, a transfer sheet from one of two transfer sheet loading bins 205 and 205 is drawn, in synchronism with the drum rotation, through a transfer station 206 where the toner on the drum surface is transferred onto the sheet. The toner image is fixed on the sheet at a fixing station 207. The sheet is then transferred to one of several sorting bins of a discharge station 208. When the machine is not in a sorting mode of operation all sheets are directed into the uppermost bin.

In one operating mode of the copying machine, different images are copied on the two sides of each transfer sheet. When the copying machine is operating in this mode, a transfer sheet which has passed through the fixing station 207 and into the discharge station 208, is then conveyed in the reverse direction and is directed by a direction changeover member 209 to a re-feeding transfer sheet loading station 210. Now, when the image of a subsequent original is directed onto the drum 202 and is developed, as above described, the transfer sheet in the re-feeding transfer sheet loading station 210 is fed through the transfer station 206 with its reverse side facing the drum 202. As a result, the images of two successively read originals are applied to the opposite sides of a single sheet.

Figure 3:
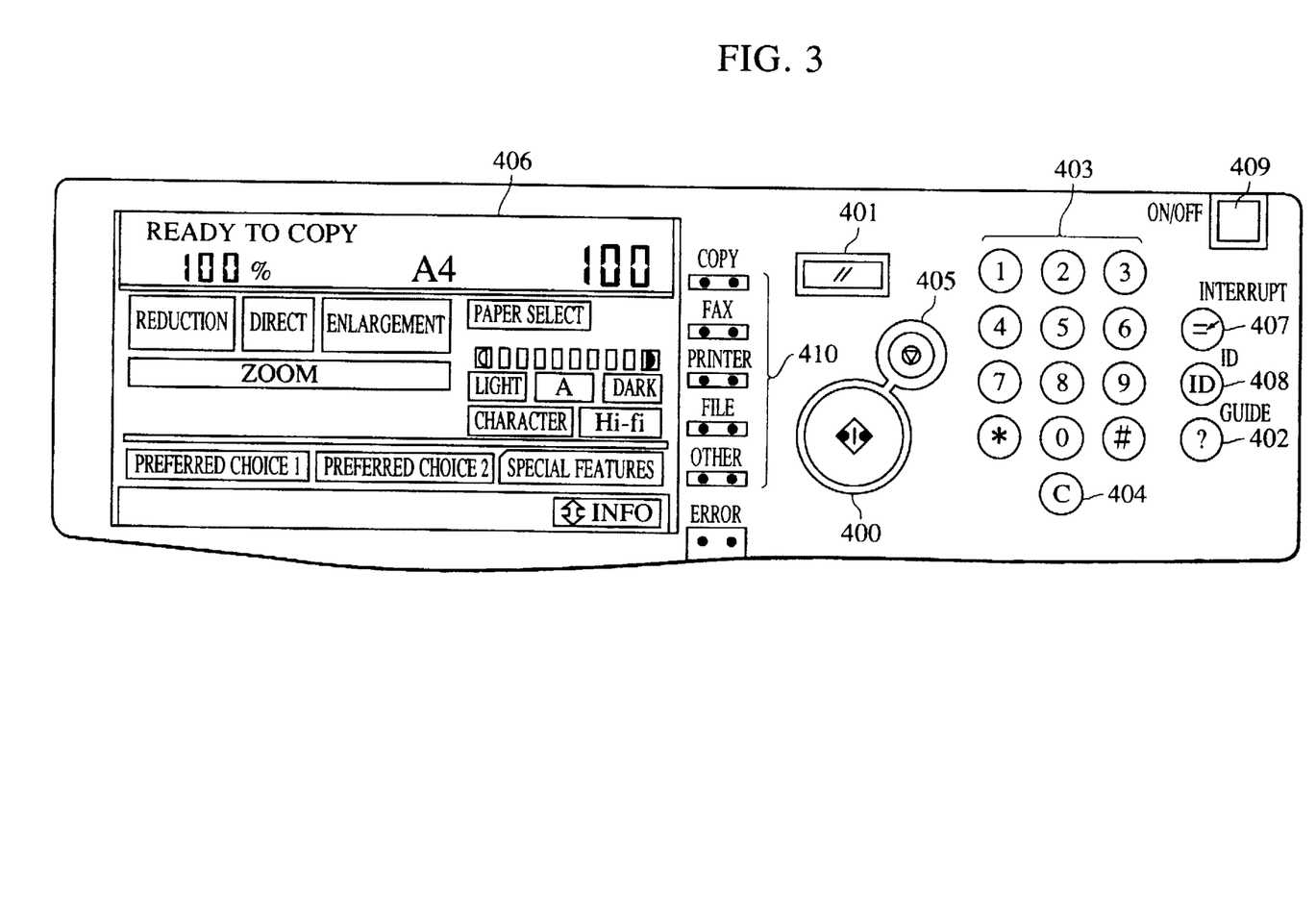
FIG. 3 is a front view of an operation mode control panel and display screen used in the apparatus of FIG. 1.

The copying machine may be set to perform according to different modes of operation by means of the control panel and display shown in FIG. 3. This control panel and display includes a copy start key 400 for starting a copying operation. There is also provided a reset key 401 which resets the machine from a special mode of operation to a standard mode. A guide key 402 can be pressed to initiate the presentation of guidance screens for helping the operator place the copying machine into one of various special modes of operation. A specific example will be described hereinafter. A ten key pad 403 is provided to enter the number of copies to be made, to enter the user's identification number, to enter the job number and other numerical information. A clear key 404 is provided to clear any number that has been entered into the key pad 403. A stop key 405 is also provided for stopping a continuous copying operation.

The control panel of FIG. 3 also includes a liquid crystal display 406 which displays both the operating mode of the copier and the status of its printer unit. The control panel of FIG. 3 is actually the combination of the touch panel 7 and the image display section 1 of FIG. 1.

An interrupt key 407, which is also provided on the control panel shown in FIG. 3, may be pressed to interrupt any operation which is being carried out by the copier, such as continuous copying, facsimile transmission or printing, in order to perform a specific copying operation that is particularly urgent.

An identification key 408 is also provided on the control panel. This key is pressed after the operator enters his or her personal code or his or her division or department code in the ten key pad 403. This serves to limit the number of copies that the machine will make according to the authorization that has been given to that individual or to his or her department or division.

A main on/off switch 409 is provided on the control panel, as well as several function keys 410. These are pressed to initiate various functions such as copy, facsimile, printer, file or other functions.

Although the guide key 402 is shown on the control panel next to the interrupt and identification keys 407 and 408, it is to be understood that the guide key 402 may also be displayed on display screen 406; and it may be actuated by pressing on the display screen at a location thereon where the guide key 402 appears.

Figures 4, 4B:
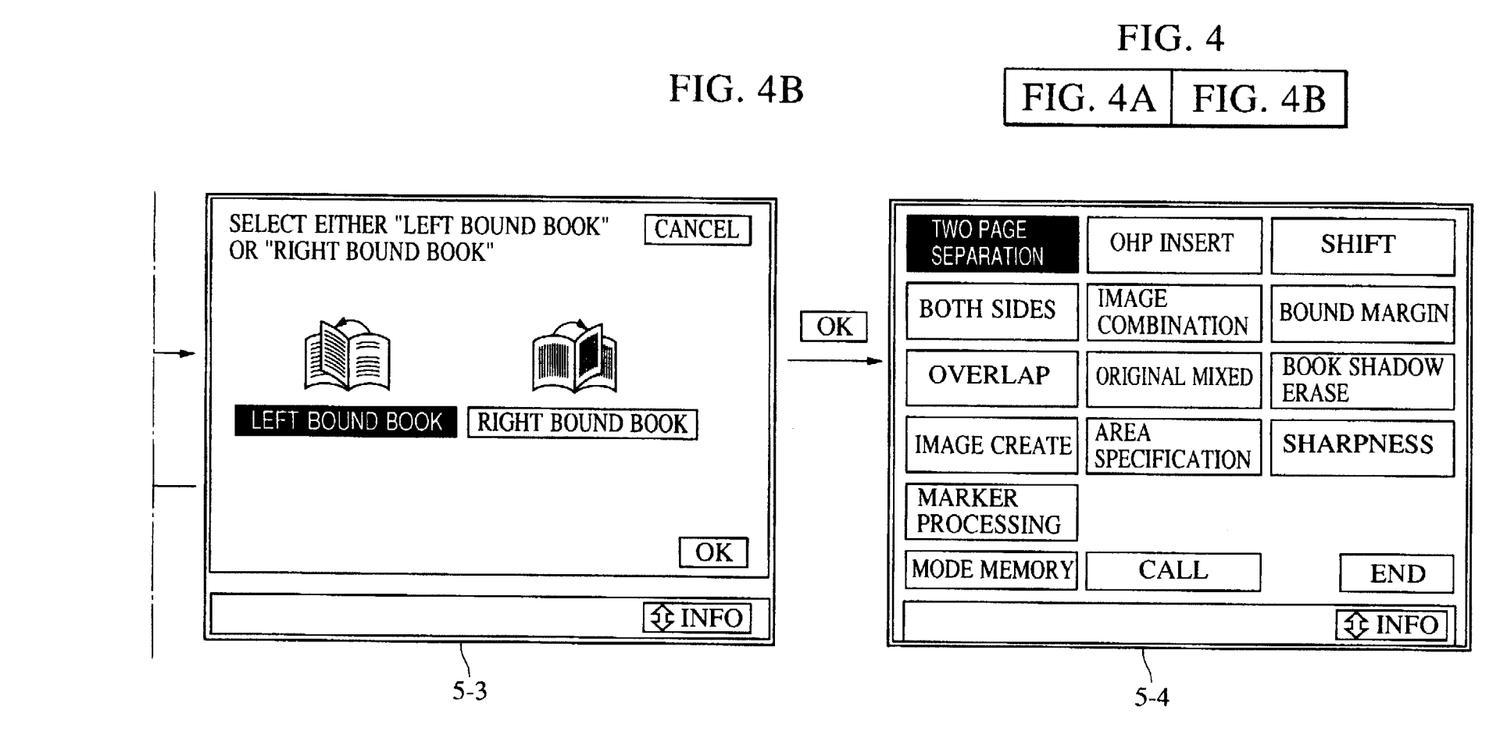
FIGS. 4A and 4B are a series of display screens which appear when the apparatus of FIG. 1 is being set to a multipage mode operation without the pressing of a guidance key.
Figure 4A:
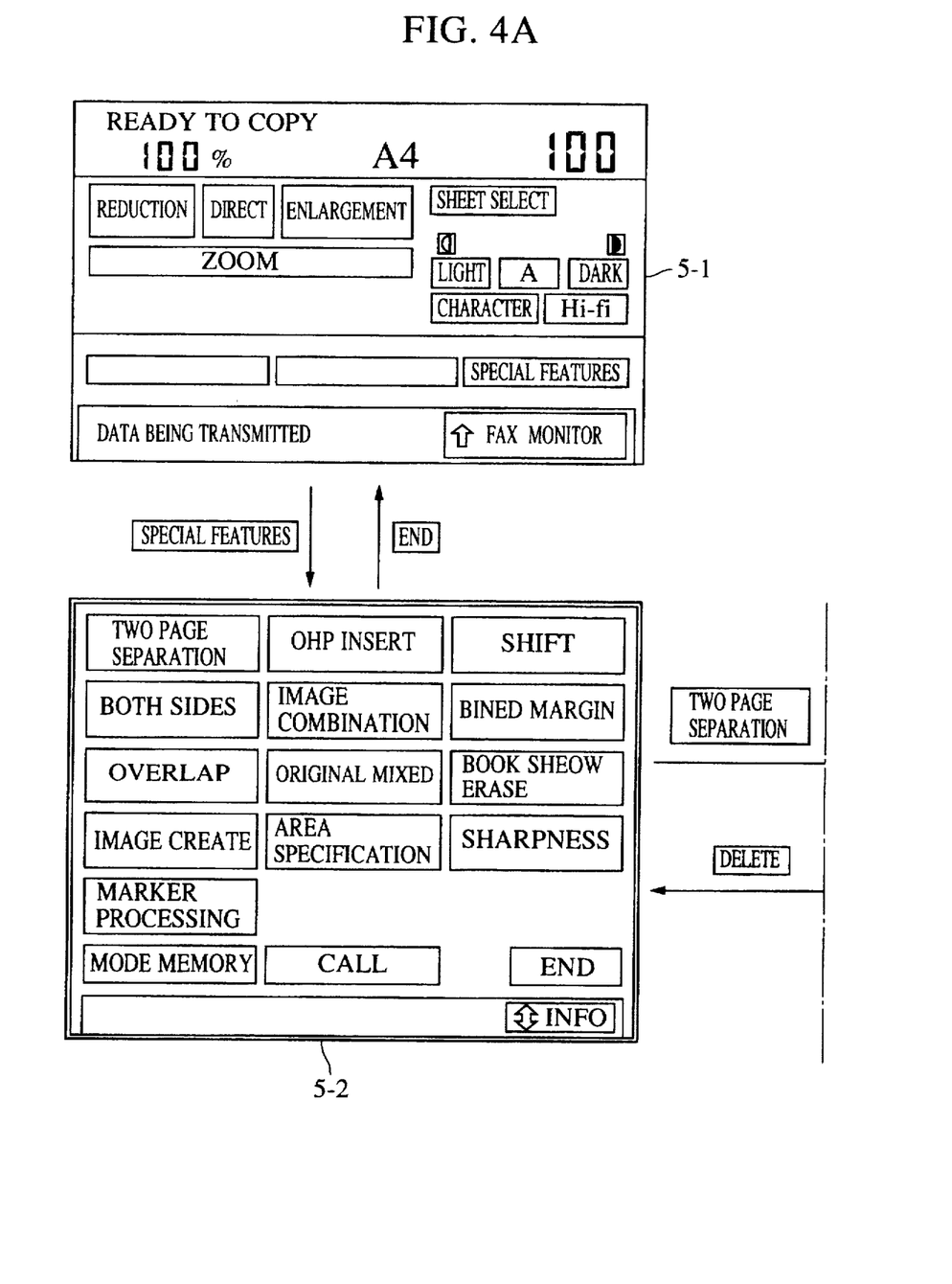
Figure 5:
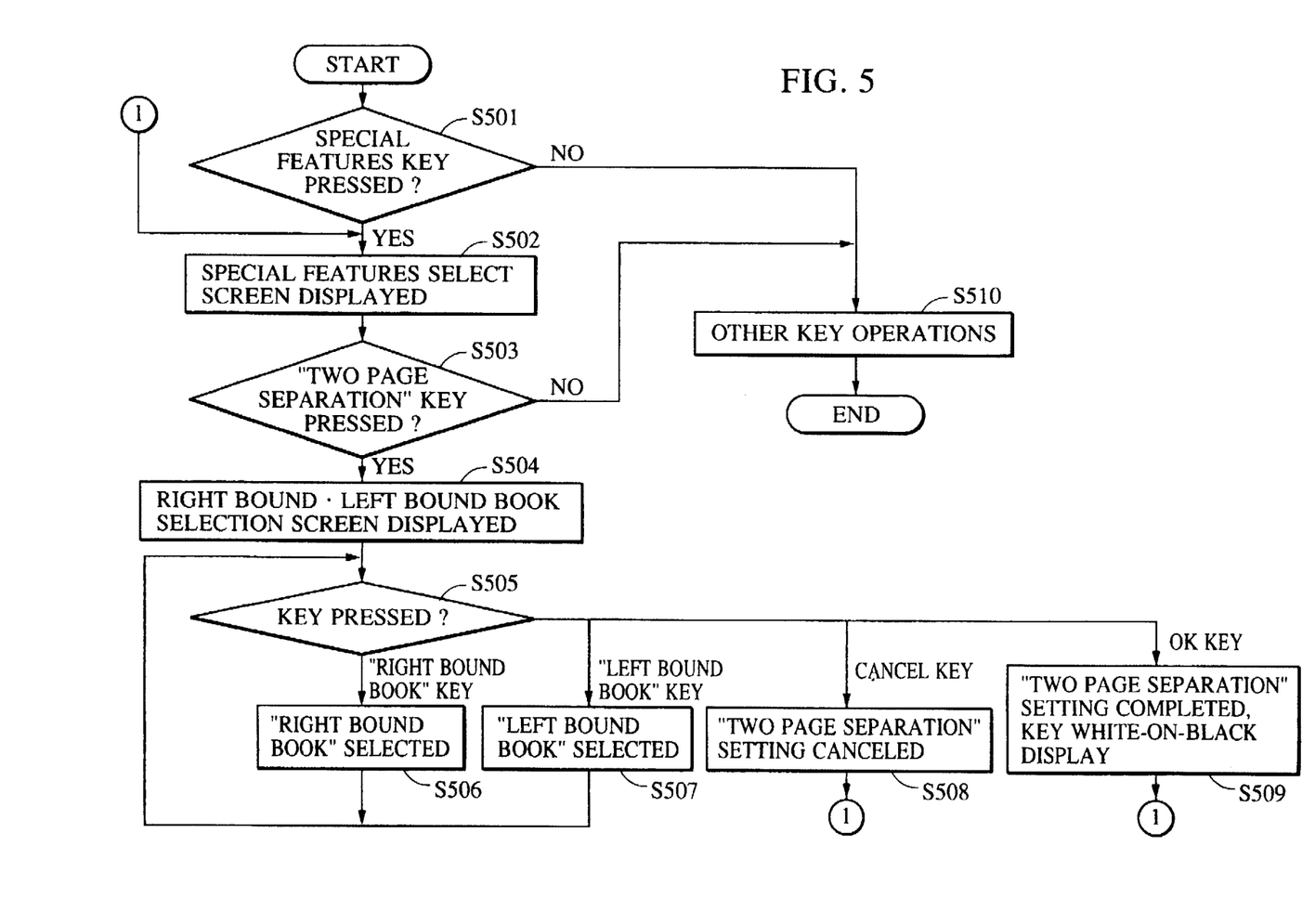
FIG. 5 is a flow chart illustrating the use of the apparatus of FIG. 1 to set the copier to a multipage mode operation.
Figures 6, 6A:
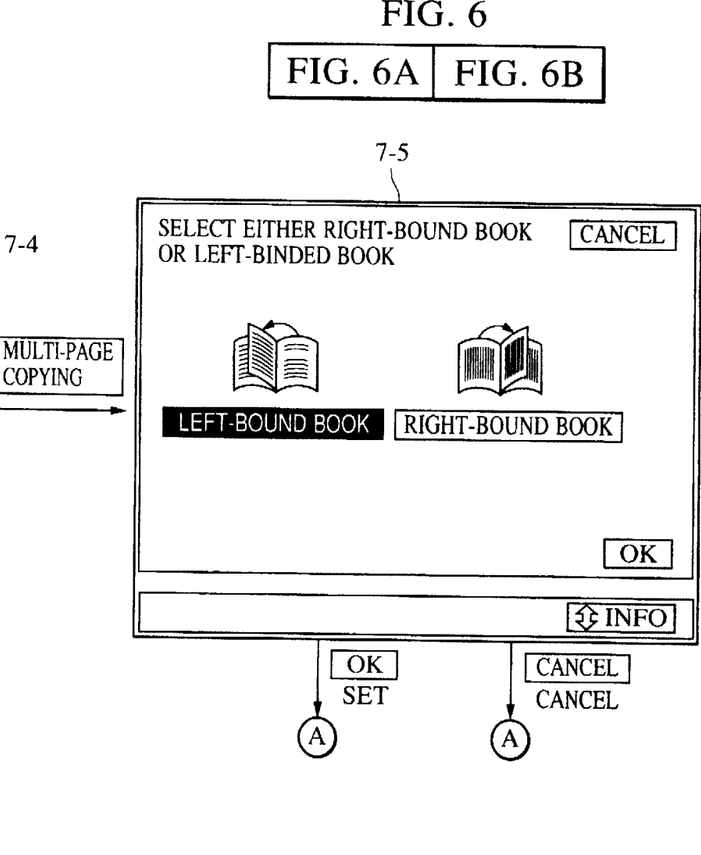
FIGS. 6A and 6B are a series of display screens which appear when the apparatus of FIG. 1 is being set to a multipage mode operation after a guidance key has been pressed.
Figure 6A:
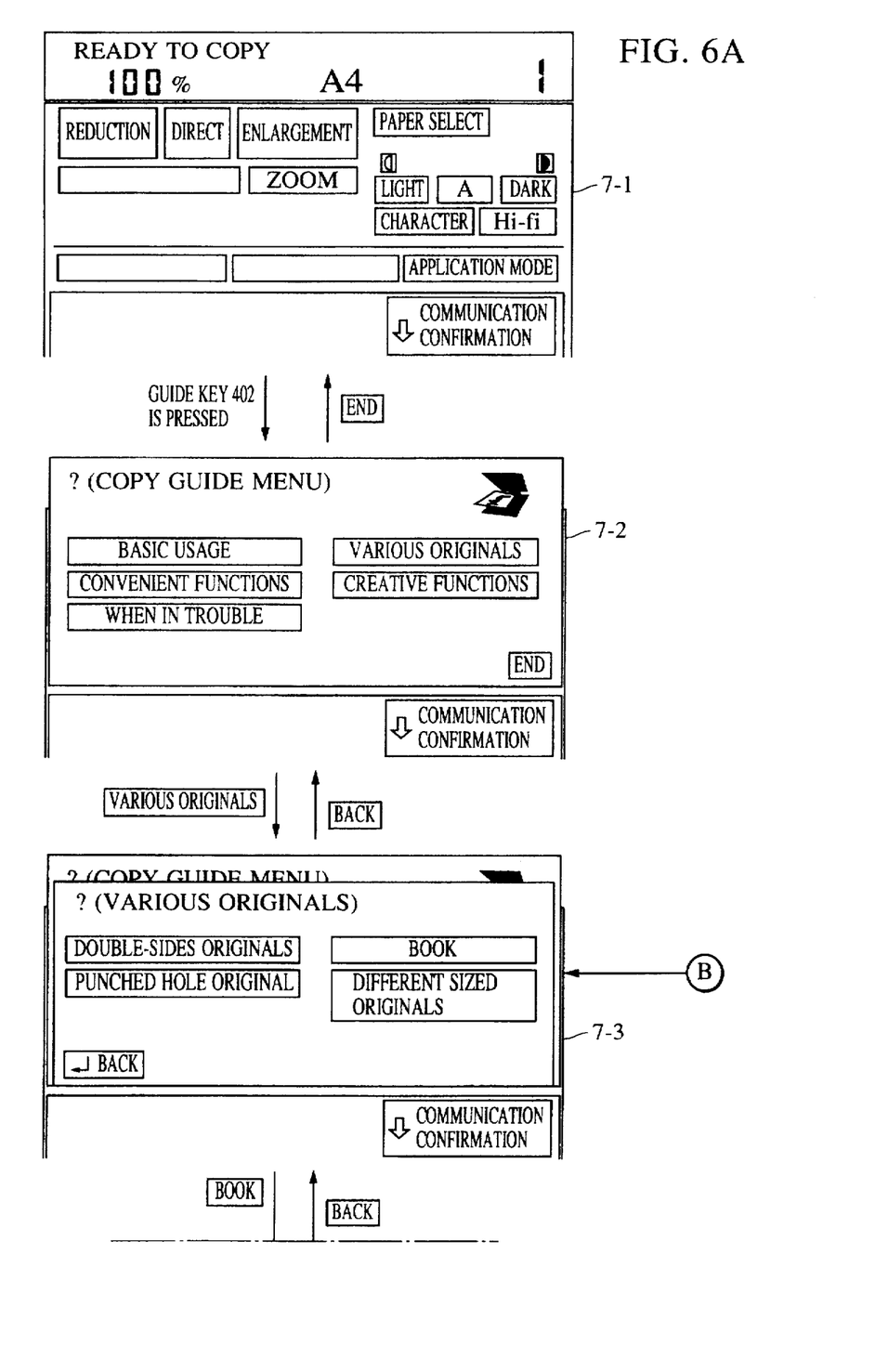
Figure 6B:
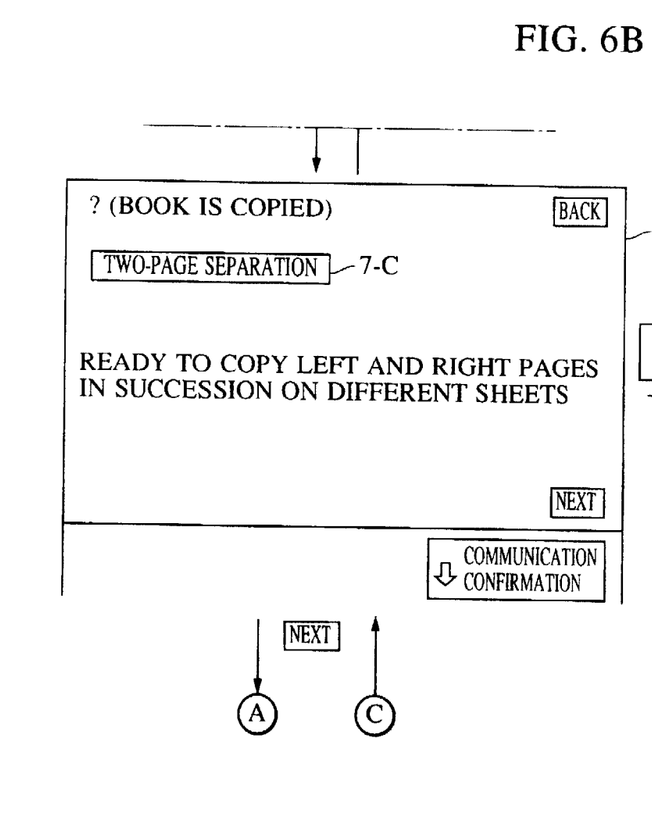

The screen displays of FIGS. 4, 4A and 4B, and the flow diagram of FIG. 5, are useful in describing the operation of setting the copier to perform a two-page copying operation in cases where the guide key 402 is not actuated.

In FIG. 4A an initial screen 5-1 is displayed. When the operator desires to set the copier to its two-page separation mode of operation, he or she presses a "SPECIAL FEATURES" key (step S501 in FIG. 5) which is being displayed on this initial screen. Actually the operator touches the screen where the "SPECIAL FEATURES" key is being displayed. Information as to the location on the screen that was touched is supplied to the CPU (FIG. 1). The CPU, in turn, causes the screen display to change to that shown at 5-2 (step S502 in FIG. 5). As can be seen in FIG. 4A, this screen displays several "special feature" options or keys, including a "TWO-PAGE SEPARATION" key (step S503).

When the TWO-PAGE SEPARATION key is pressed (step S503 in FIG. 5), the CPU 5 (FIG. 1) causes the screen display to change to that shown at 5-3 in FIG. 4B (step S504 in FIG. 5). This screen permits the operator to choose further details regarding the operation of the copier in the two-page separation mode. In this case the screen display 5-3 shows the possibility of choosing a right bound book (step S505 in FIG. 5) or a left bound book (step S506 in FIG. 5). That is, when the multiple pages are to be bound as in a book, the image can be positioned according to which edge of the transfer sheet pages the binding is to be located.

After pressing the appropriate key to initiate the step S506 or S507, the selected key is displayed as a white on black representation as shown in screen 5-4 in FIG. 4B. At this point, the operator presses an "OK" key on the screen 5-3 (step S509 in FIG. 5). The CPU then changes the display screen to that shown in 5-4. This is the same as the screen 5-2 except that the "TWO PAGE SEPARATION" key is now represented as white on black. A "CANCEL" key shown in screen 5-3 in FIG. 4B (step S108 in FIG. 5) may be pressed to cancel the setting operation; or an "OK" key (S509 in FIG. 5) may be pressed to indicate that the setting operation is complete. Pressing either the "CANCEL" key (step S508) or the "OK" key (step S509), returns the screen display to 5-2 shown in FIG. 4A or to 5-4 shown in FIG. 4B.

In the event the operator desires to set the operation mode of the copier to other special features, this can be done in the same manner as described above in regard to the "TWO-PAGE SEPARATION" mode. When the setting is complete, the operator presses the "END" key on screen 5-4 to end the setting operations.

While an experienced operator may not have difficulty in setting a particular operation mode according to the above described procedure, this procedure may be difficult for an inexperienced operator. This is because the operator is likely to have difficulty in deciding which "SPECIAL FEATURE" to select from the several "SPECIAL FEATURES" which are arranged in row and columns on the "SPECIAL FEATURES" screen. Further the various special features are identified by different names according to different copier manufacturers.

FIGS. 6, 6A and 6B, 7A and 7B show various screen displays which appear when the guidance key 402 (FIG. 1) is pressed and the two-page separation mode of operation is being set; and FIGS. 8, 8A, 8B and FIG. 9 show the flow diagram version of the two-page setting operation. The two-page separation mode of operation is set when the user wishes to copy a book.

Figures 8, 8B:
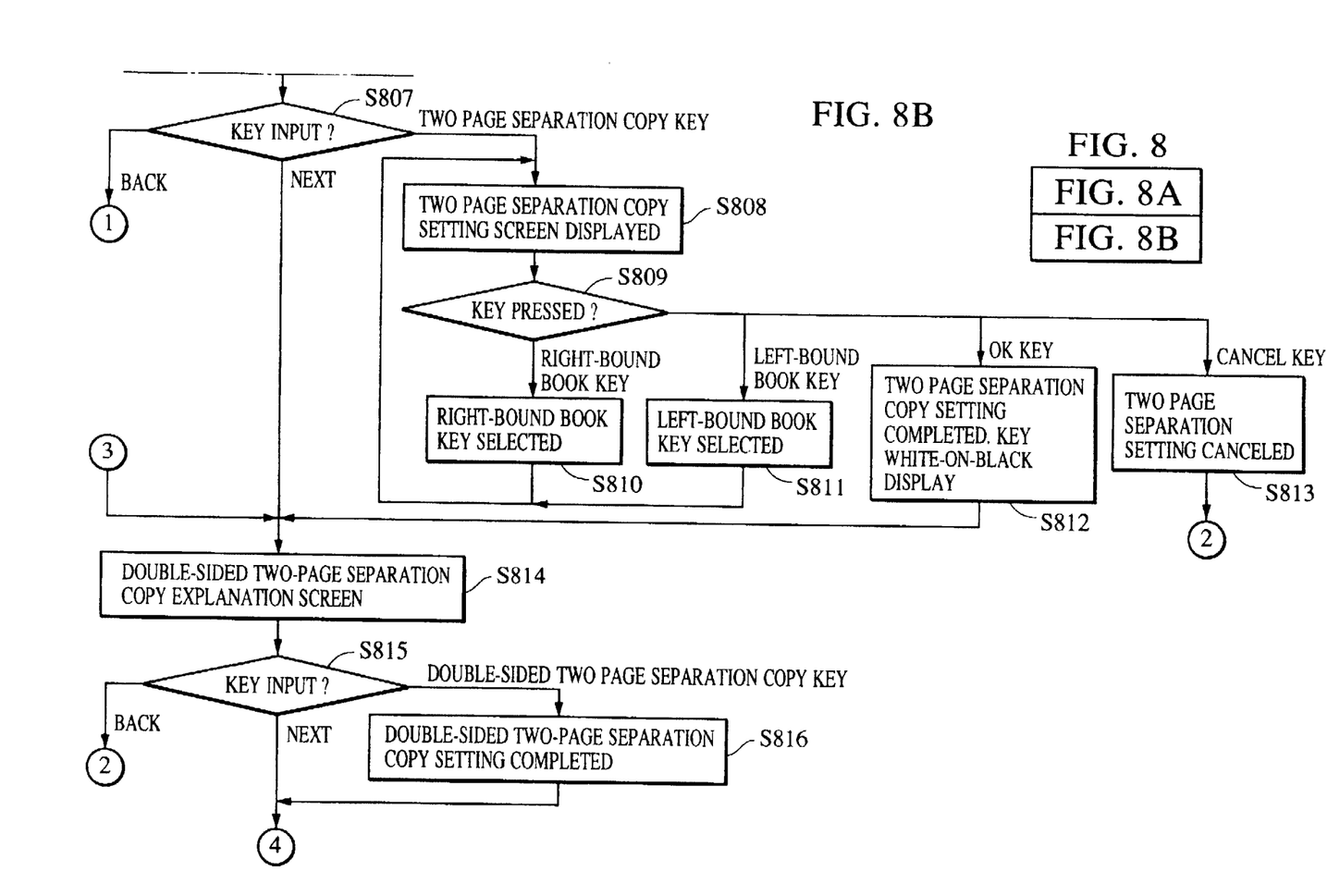
FIGS. 8A and 8B are a flow chart illustrating the use of the apparatus of FIG. 1 to set the copier to a multipage mode operation after a guidance key has been pressed.
Figure 8A:
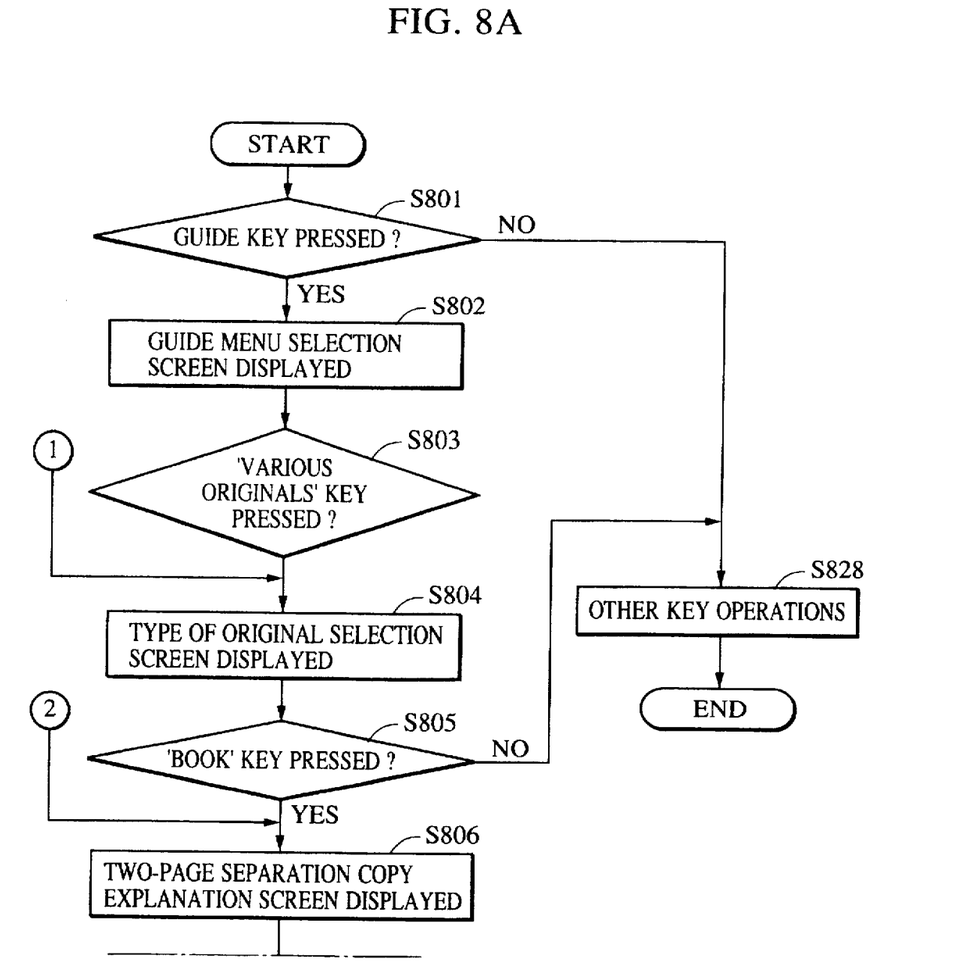

While the standard screen is being displayed and the user wishes to have guidance in obtaining the two-page separation mode of operation to make a copy of a book, the user first presses the GUIDE key 402 (FIG. 3) (Step S801 in FIG. 8A). This causes the LCD 406 (FIG. 3) to change its display screen to that shown as screen 7-2 in FIG. 6A (step S802 in FIG. 8A). The user, who wishes to copy a book, then selects the "VARIOUS ORIGINALS" key from the display screen and presses it (step S803 in FIG. 8A). This causes the LCD 406 to change its display screen to that shown as 7-3 in FIG. 6A. This screen displays a "BOOK" key which, when pressed, causes the screen presentation to change to that shown at 7-4 in FIG. 6B (step S805 in FIG. 8A). Screen 7-4 displays guidance information concerning the mode of operation related to book copying (two-page separation).

Figures 7, 7A:
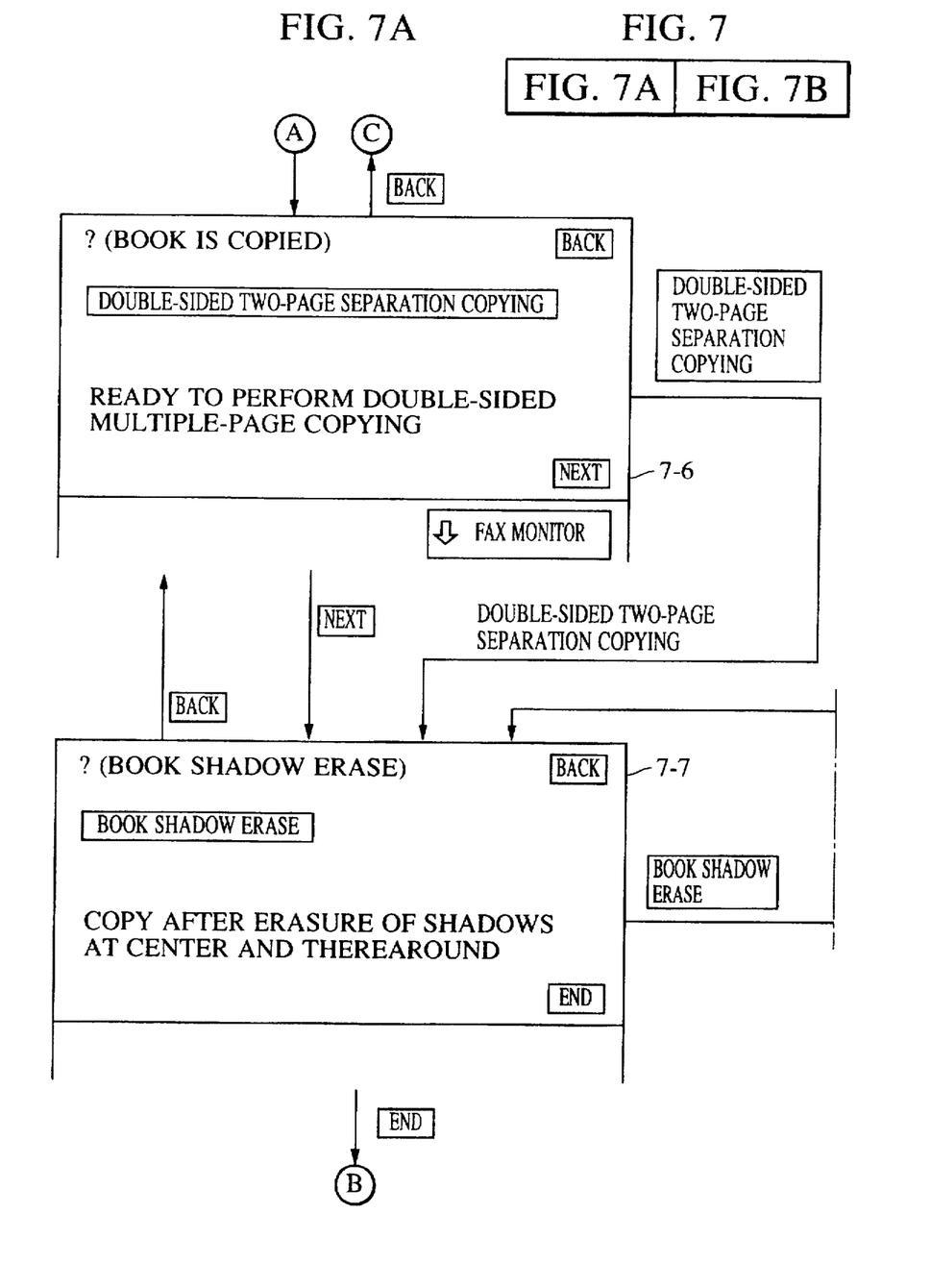
FIGS. 7A and 7B are a further series of display screens which appear when the apparatus of FIG. 1 is being set to a multipage mode operation after the guidance key has been pressed.

When the "NEXT" key on the screen 7-4 is pressed (step S807 in FIG. 8B), the screen display changes to that shown as 7-6 of FIG. 7A (step S-814 in FIG. 8B). The screen 7-6 displays guidance information concerning double-sided two-page separation. When the "NEXT" key is pressed again (step S815 in FIG. 8B), the screen display changes to that as shown at 7-7 in FIG. 7 (step S817 in FIG. 8B). This screen now displays guidance information regarding book frame erasure.

Returning to screen 7-4, this screen also displays a "TWO-PAGE SEPARATION" key which, when pressed, changes the screen display to that shown at 7-5 (step S808 in FIG. 8B). This display provides two-page separation setting information; and it permits one to select either a left side binding or a right side binding (steps S810 and S811 in FIG. 8B). At this point an "OK" key on screen 7-5 may be pressed to set the operation mode (step S812 in FIG. 8B).

Figure 7B:
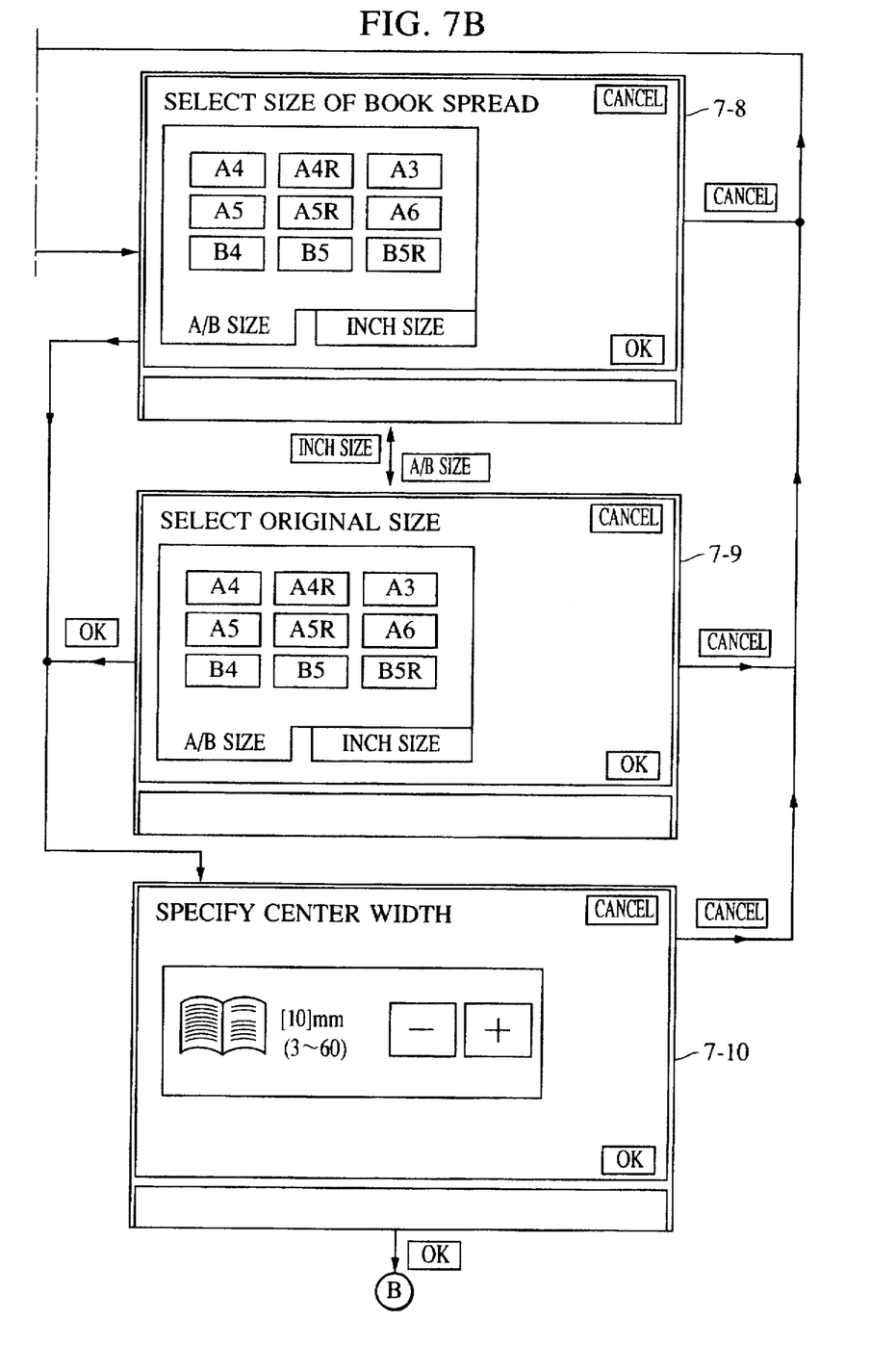
Figure 9:
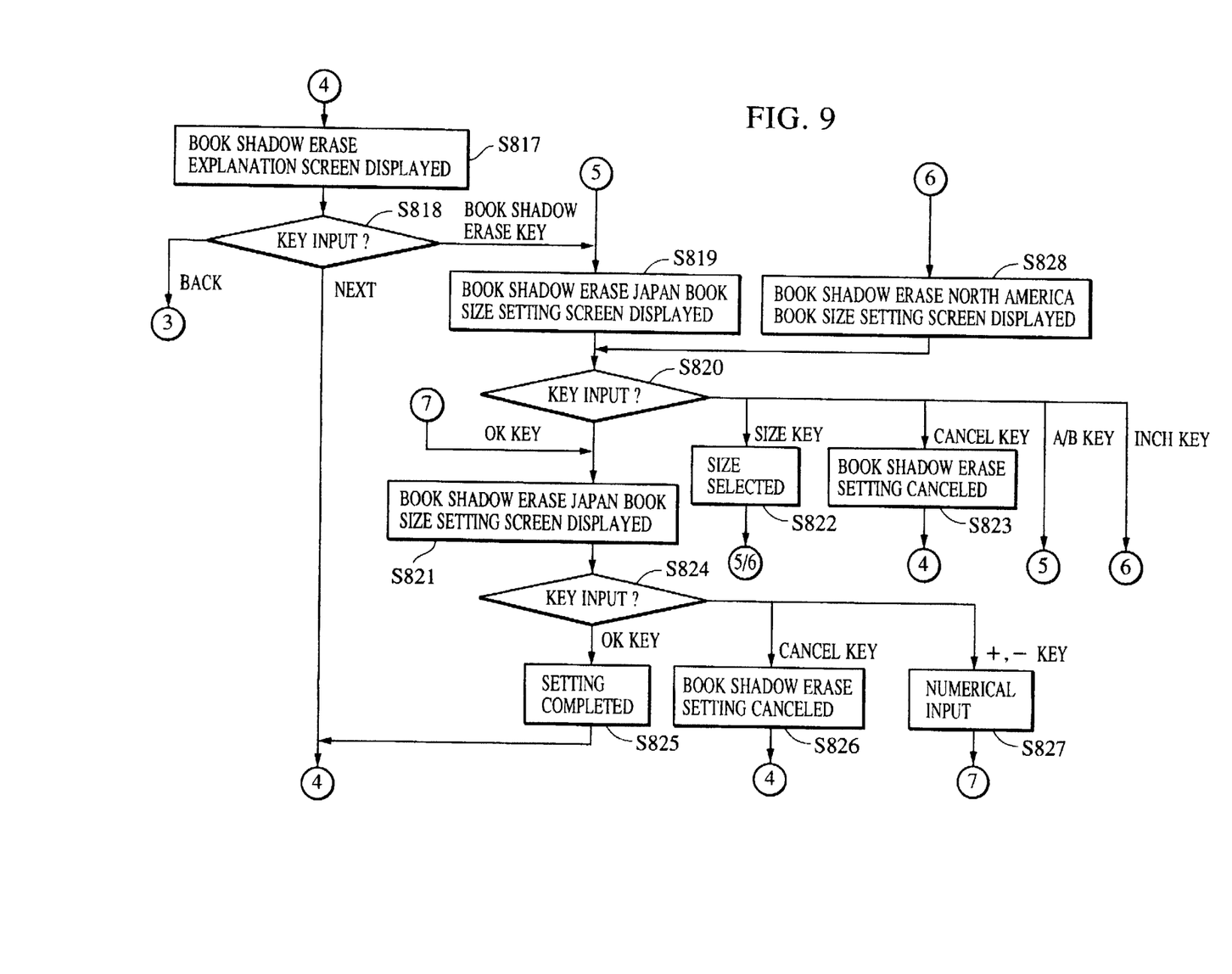
FIG. 9 is a continuation of the flow chart of FIG. 8 illustrating the use of the apparatus of FIG. 1 when a "book frame erase" key has been pressed.

Screen 7-7 also displays a "BOOK FRAME ERASE" key which, when pressed, changes the screen display to that shown as 7-8 in FIG. 7B, (step S819 in FIG. 9). This allows the user to set the book frame erasure size. Pressing an "OK" key on this screen causes the screen to change to the screen shown as 7-10 shown in FIG. 7B (step S821 in FIG. 9). This allows the user to set the frame erasing width at the center of the book.

Other settings and operations can be performed in a similar manner, using the various screen displays and steps shown in FIGS. 6-9.

As can be seen from the foregoing, it is possible to set a desired operation mode while displaying guidance information, so that even an inexperienced operator can readily set the desired operation mode.

It will be appreciated that with this invention, the guidance display is made integral with the operation mode setting key displays; and the guidance display and the operation mode setting keys do not have to be separately presented as was previously necessary. Consequently, this invention makes it easier to set an operation mode. In addition, the invention permits an experienced operator to set a desired operation mode simply by using the conventional setting screen display.

In the foregoing description, the operation mode setting and the corresponding setting screens have been described for the case where a book is to be copied. If this "book" is thought of as a "thick original", selections can be made from screens which contain the ordinary "ORIGINAL FRAME ERASE" information and "BOOK FRAME ERASE information, using the "BOOK FRAME ERASE" guidance and setting screens.

As can be understood from the foregoing description, the guidance screen display is edited based on the purpose of the copying, what functions are convenient and fundamental, and other reasons; and the appropriate setting keys are included in their respective guidance information screen displays.

While a preferred embodiment of the present invention has been described, it is to be understood that various modifications may be made without departing from the scope of the appended claims.

What is claimed is:

1. An operation mode setting device comprising:

a touch panel display;

a guidance key connected to cause guidance information regarding a settable operation mode to be displayed on said touch panel display;

first control means connected to respond to an input from said guidance key to cause said touch panel display to display guidance information along with a display of an operation mode setting key; and second control means connected to respond to the input from said operation mode setting key displayed along with the guidance information on said touch panel display in order to set the operation mode;

said first control means being further connected to cause a group of operation mode setting keys to be displayed on said touch panel display prior to an input from said guidance key.

2. An operation mode setting device according to claim 1, wherein said operation mode is related to image formation.

3. An operation mode setting device comprising:

a guidance key arranged to produce a display of guidance information regarding a desired mode setting;

first setting means for setting a desired operation mode without input from said guidance key; and second setting means for setting a desired operation mode in response to the display of guidance information produced by operation of said guidance key, wherein said device includes a first setting screen which appears when setting a predetermined operation mode by means of said first setting means, and a second setting screen which appears when setting the same predetermined operation mode by means of said second setting means, said first and second setting screens being different from each other.

4. An operation mode setting device according to claim 3, wherein said operation modes are related to image formation.

5. A method of setting an operation mode in an apparatus which includes a touch panel display and a guidance key that causes display of guidance information regarding a settable operation mode, said method comprising the steps of:

a) displaying, in said touch panel display, both guidance information and an operation mode setting key, in response to an input from said guidance key;

b) setting a operation mode in response to an input from the operation mode setting key displayed on said touch panel; and c) displaying a group of operation mode setting keys on said touch panel display prior to input from said guidance key.

6. A method according to claim 5, wherein said operation mode is related to image formation.

7. A method of setting an operation mode in an apparatus which includes display means and a guidance key that causes display of guidance information regarding a settable operation mode, said method comprising the steps of:

a) setting a desired operation mode without input from said guidance key by displaying a first setting screen which appears when setting a predetermined operation mode on said display means; and b) setting a desired operation mode in response to the display of guidance information produced by operation of said guidance key by displaying a second setting screen which appears when setting the same predetermined operation mode, said first and second setting screens being different from each other.

8. A method according to claim 7, wherein said operation mode is related to image formation.

9. An operation mode setting device comprising:

a touch panel display;

a guidance key for causing said touch panel display to display guidance information regarding a settable operation mode;

first control means for causing said touch panel display to display guidance information along with a display of an operation mode setting key to respond to an input from said guidance key; and second control means for setting the operation mode to response to the input from said operation mode setting key displayed along with the guidance information on said touch panel display, wherein said first control means further causing said touch panel display to display a group of operation mode setting keys prior to an input from said guidance key.

10. An operation mode setting device according to claim 9, wherein said operation is related to image formation.

* * * * *

UNITED STATES PATENT AND TRADEMARK OFFICE
CERTIFICATE OF CORRECTION

PATENT NO. : 5,768,657
DATED : June 16, 1998
INVENTOR(S) : HIROYUKI KIMURA, et al.

It is certified that error appears in the above-identified patent and that said Letters Patent is hereby corrected as shown below:

SHEET 4 of 13:

FIG. 4A, "BINED" should read --BOUND-- and "SHEOW" should read --SHADOW--.

COLUMN 3:

Line 56, "bins 205 and 205" should read --bins 204 and 205--.

COLUMN 5:

Line 22, "two page" should read --two-page--.
Line 42, "row" should read --rows--.

UNITED STATES PATENT AND TRADEMARK OFFICE
CERTIFICATE OF CORRECTION

PATENT NO. : 5,768,657

DATED : June 16, 1998

INVENTORS : HIROYUKI KIMURA, et al.

It is certified that error appears in the above-identified patent and that said Letters Patent is hereby corrected as shown below:

COLUMN 6:

Line 48, "erase" (second occurrence) should read --erase"--.

COLUMN 7:

Line 41, "a" should read --an--.

COLUMN 8:

Line 34, "response" should read --respond--.

Signed and Sealed this

Twenty-third Day of February, 1999

Attest:

Q. TODD DICKINSON

*Attesting Officer*   *Acting Commissioner of Patents and Trademarks*